US012090594B2

(12) United States Patent
Takida et al.

(10) Patent No.: US 12,090,594 B2
(45) Date of Patent: Sep. 17, 2024

(54) INDEXING DEVICE

(71) Applicant: TSUDAKOMA KOGYO KABUSHIKI KAISHA, Ishikawa-ken (JP)

(72) Inventors: Takashi Takida, Ishikawa-ken (JP); Junichiro Ishizaki, Ishikawa-ken (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 0 days.

(21) Appl. No.: 18/126,725

(22) Filed: Mar. 27, 2023

(65) Prior Publication Data

US 2023/0339061 A1 Oct. 26, 2023

(30) Foreign Application Priority Data

Apr. 21, 2022 (JP) ................................ 2022-069899

(51) Int. Cl.
*B23Q 16/02* (2006.01)
*F16H 1/20* (2006.01)
(Continued)

(52) U.S. Cl.
CPC ............... *B23Q 16/02* (2013.01); *F16H 1/20* (2013.01); *F16H 19/08* (2013.01);
(Continued)

(58) Field of Classification Search
CPC .... B23Q 16/02; B23Q 16/022; B23Q 16/025; F16H 1/16; F16H 1/20; F16H 19/08;
(Continued)

(56) References Cited

U.S. PATENT DOCUMENTS

| 6,634,264 B1 * | 10/2003 | Takeuchi | ............. | B23Q 16/102 |
| | | | | 82/121 |
| 6,698,306 B2 * | 3/2004 | Tatsuda | ................ | F16H 37/065 |
| | | | | 74/427 |
| 2010/0019427 A1 * | 1/2010 | Nishida | ................ | B23Q 16/102 |
| | | | | 269/57 |

FOREIGN PATENT DOCUMENTS

GB 1352681 A 5/1974
JP S63-067052 U 5/1988

OTHER PUBLICATIONS

Sep. 18, 2023, European Search Report issued for related EP Application No. 23164682.9.

* cited by examiner

*Primary Examiner* — Adam D Rogers
(74) *Attorney, Agent, or Firm* — Paratus Law Group, PLLC

(57) ABSTRACT

An indexing device includes a drive transmission mechanism, a fixing mechanism. The drive transmission mechanism includes an intermediate gear which includes an intermediate shaft being inserted at an end portion into an accommodation hole formed in a frame, and the intermediate shaft includes an accommodating concave portion and a plurality of through-holes. The fixing mechanism includes a cylindrical pressing member, steel balls and a screw member. There is a gap between the pressing member and a bottom surface of the pressing member in a state in which the pressing member is accommodated in the accommodating concave portion and the steel ball accommodated in each through-hole is in contact with a tapered surface and an inner peripheral surface of the accommodation hole.

1 Claim, 5 Drawing Sheets

(51) Int. Cl.
  *F16H 19/08* (2006.01)
  *F16H 57/00* (2012.01)
  *F16H 57/02* (2012.01)
  *F16H 57/039* (2012.01)
  *F16H 57/021* (2012.01)

(52) U.S. Cl.
  CPC ....... *F16H 57/0031* (2013.01); *F16H 57/039* (2013.01); *F16H 2057/0213* (2013.01)

(58) Field of Classification Search
  CPC .. F16H 37/041; F16H 57/0031; F16H 57/023; F16H 57/039; F16H 2057/02073; F16H 2057/0213
  See application file for complete search history.

INDEXING DEVICE

CROSS-REFERENCE TO RELATED APPLICATION(S)

This application is based on and claims priority under 35 USC 119 from Japanese Patent Application No. 2022-069899 filed on Apr. 21, 2022, the contents of which are incorporated herein by reference.

TECHNICAL FIELD

The present invention relates to an indexing device configured to index an angular position of a drive target object by using a drive motor as a drive source, and including a drive transmission mechanism including a first gear attached to an output shaft of the drive motor, a second gear attached to a drive shaft for driving the drive target object, and an intermediate gear configured to transmit rotation of the first gear to the second gear and rotatably supported with respect to an intermediate shaft fixed to a frame, the intermediate shaft being inserted at an end portion into an accommodation hole formed in the frame.

BACKGROUND ART

As an indexing device that is used for a working machine, for example, there is a rotation indexing device including a main shaft having one end to which a table on which a workpiece is placed is fixed, and a drive motor serving as a drive source for rotationally driving the main shaft, and configured to index an angular position of the table as a drive target object by rotationally driving the main shaft with the drive motor. The rotation indexing device has a drive transmission mechanism for transmitting drive of the drive motor to the main shaft, in its frame. In addition, the drive transmission mechanism includes a drive shaft for rotationally driving the main shaft (table), a gear (first gear) attached to an output shaft of the drive motor and a gear (second gear) attached to the drive shaft. In addition, regarding the drive transmission mechanism, there is one having a gear (intermediate gear) for transmitting rotation of the first gear to the second gear. Patent Literature 1 discloses a rotation indexing device including such an intermediate gear.

The device of Patent Literature 1 is a rotation indexing device in which the drive shaft in the drive transmission mechanism described above is a worm shaft. That is, the drive transmission mechanism in the rotation indexing device (hereinafter, referred to as 'existing device') in Patent Literature 1 includes a so-called worm gear mechanism configured by a worm wheel attached to the main shaft and a worm shaft including a worm in mesh with the worm wheel. In the drive transmission mechanism, the intermediate gear is supported by an intermediate shaft provided in a form of being inserted into a shaft hole (accommodation hole) of the frame at an end portion. Note that, the intermediate shaft is non-rotatably fixed to the frame, and the intermediate gear is rotatably supported with respect to the intermediate shaft.

In the existing device, as a mechanism (fixing mechanism) for fixing the intermediate shaft to the frame, a lock mechanism using a locking screw and a steel ball is employed. As for the fixing mechanism (lock mechanism), more specifically, the intermediate shaft is formed at the end portion inserted into the accommodation hole with a plurality of female screw holes opened to an end face thereof and penetrating toward an axis line direction and through-holes each penetrating from each female screw hole toward an outer peripheral surface. In addition, the locking screw is screwed into the female screw hole at the end portion of the intermediate shaft, and is configured as a so-called tapered locking screw with a tapered surface at a tip end portion.

In the fixing mechanism, the steel ball is disposed in each of the through-holes at the end portion of the intermediate shaft, and the locking screw is screwed into each of the female screw holes, so that the steel ball is disposed between the tapered surface of the locking screw and an inner peripheral surface of the accommodation hole. Further, by tightening the locking screw so as to be displaced in the axis line direction and thus applying an axial pressing force to the steel ball, a radial force acts on the inner peripheral surface of the accommodation hole via the steel ball, and the intermediate shaft is fixed to the frame.

CITATION LIST

Patent Literature

Patent Literature 1: JPS63-067052U

In the existing device employing the fixing mechanism as described above, a problem arises in that a coolant liquid used during workpiece processing is infiltrated into the frame, and accordingly, the lubrication performance of a lubricating oil stored in the frame is lowered.

Specifically, in a working machine, when performing machine processing such as cutting processing and grinding processing, the processing is performed while applying a large amount of coolant liquid to a part where a tool and a workpiece come into contact with each other. For this reason, also to the rotation indexing device on which the workpiece is placed, a large amount of coolant liquid is applied during the processing.

Note that, in the existing device employing the fixing mechanism as described above, the intermediate shaft is provided such that its end face is exposed to an outside, and along with this, the opening of each female screw hole formed at the end portion thereof is also exposed to the outside. In addition, the locking screw is screwed into each female screw hole, so that each female screw hole is in a closed state. However, since each female screw hole and the locking screw are combined with each other by screwing, there is a slight gap therebetween. Furthermore, in such a configuration, a seal member cannot be provided between the female screw hole and the locking screw.

For this reason, when the coolant liquid is applied to the rotation indexing device as described above and reaches the opening of each female screw hole exposed to the outside as described above at the intermediate shaft, the coolant liquid may pass through the gap between the female screw hole and the locking screw and then infiltrate into the frame via the through-hole in communication with the female screw hole. In this case, the coolant liquid is mixed with the lubricating oil stored so as to lubricate the drive transmission mechanism in the frame, so that the lubrication performance of the lubricating oil is lowered.

Note that, in order to prevent infiltration of the coolant liquid from the gap between the female screw hole and the locking screw, for example, a countermeasure of applying a liquid sealant to a male screw portion of the locking screw is also considered. However, since the applying of the sealant is performed manually by an operator, unevenness in application may occur depending on the operator, and therefore, the countermeasure lacks in certainty with respect to infiltration prevention of the coolant liquid.

SUMMARY

Therefore, in view of the above situations, the present invention is to provide an indexing device with a configuration capable of preventing infiltration of the coolant liquid into a frame more reliably.

The preamble of the present invention is an indexing device configured to index an angular position of a drive target object by using a drive motor as a drive source, and including:
a drive transmission mechanism including:
a first gear attached to an output shaft of the drive motor;
a second gear attached to a drive shaft for driving the drive target object; and
an intermediate gear configured to transmit rotation of the first gear to the second gear and rotatably supported with respect to an intermediate shaft fixed to a frame, the intermediate shaft being inserted at an end portion into an accommodation hole formed in the frame.

In the present invention, the indexing device of the preamble is configured such that the intermediate shaft includes:
an accommodating concave portion having a bottomed hole shape formed at the end portion, opened to an end face and formed to have a center matched with a center of an outer peripheral edge of the end face as seen in an axis line direction; and
a plurality of through-holes radially penetrating a peripheral wall around the accommodating concave portion.

In addition, the indexing device of the present invention is characterized in that a fixing mechanism for fixing the intermediate shaft to the frame includes:
a cylindrical pressing member having a tapered surface on a peripheral surface, having an insertion hole penetrating in the axis line direction at a center position, and provided such that the tapered surface faces a bottom surface of the accommodating concave portion and at least a portion of the tapered surface is located in the accommodating concave portion;
steel balls disposed in each through-hole and having a larger diameter than a thickness of the peripheral wall; and
a screw member inserted into the insertion hole of the pressing member and screwed into a female screw hole opened to the bottom surface, and
wherein, there is a gap between the pressing member and the bottom surface in a state in which the pressing member is accommodated in the accommodating concave portion and the steel ball accommodated in each through-hole is in contact with the tapered surface and an inner peripheral surface of the accommodation hole.

According to the indexing device of the present invention, in the fixing mechanism using the tapered surface and the steel ball, in order to apply an axial pressing force to the steel ball, a mechanism (displacement mechanism) for displacing the pressing member in contact with the steel ball on the tapered surface in the axis line direction uses the screw member inserted into the insertion hole of the pressing member formed as described above and screwed into the female screw hole of the intermediate shaft, not the screw mechanism between the pressing member and the intermediate shaft as in the existing device. Specifically, the displacement mechanism is configured such that the screw member configured to be displaced in the axis line direction by being tightened with respect to the intermediate shaft pushes the pressing member along with the displacement, thereby displacing the pressing member in the axis line direction.

By configuring the displacement mechanism in this way, the fixing mechanism can be configured such that an outer peripheral surface of the pressing member is brought into contact with a part (member) around of the pressing member over the entire circumference in the accommodation hole of the frame. In the fixing mechanism configured in this way, it is possible to dispose a seal member such as an O-ring between the outer peripheral surface of the pressing member and the part around the pressing member. Therefore, according to the indexing device of the present invention in which the fixing mechanism (displacement mechanism) is configured as described above, when the seal member is disposed appropriately in this way, infiltration of the coolant liquid into the frame can be prevented as much as possible, and therefore, the lubrication performance of the lubricating oil can be prevented from being lowered.

DESCRIPTION OF EMBODIMENTS

Hereinafter, one embodiment of an indexing device to which the present invention is applied will be described with reference to FIGS. 1 to 5. Note that, the present embodiment is an example in which the indexing device is a so-called rotary table device having a table on which a workpiece is placed, and configured to index an angular position of the table.

Figure 1:
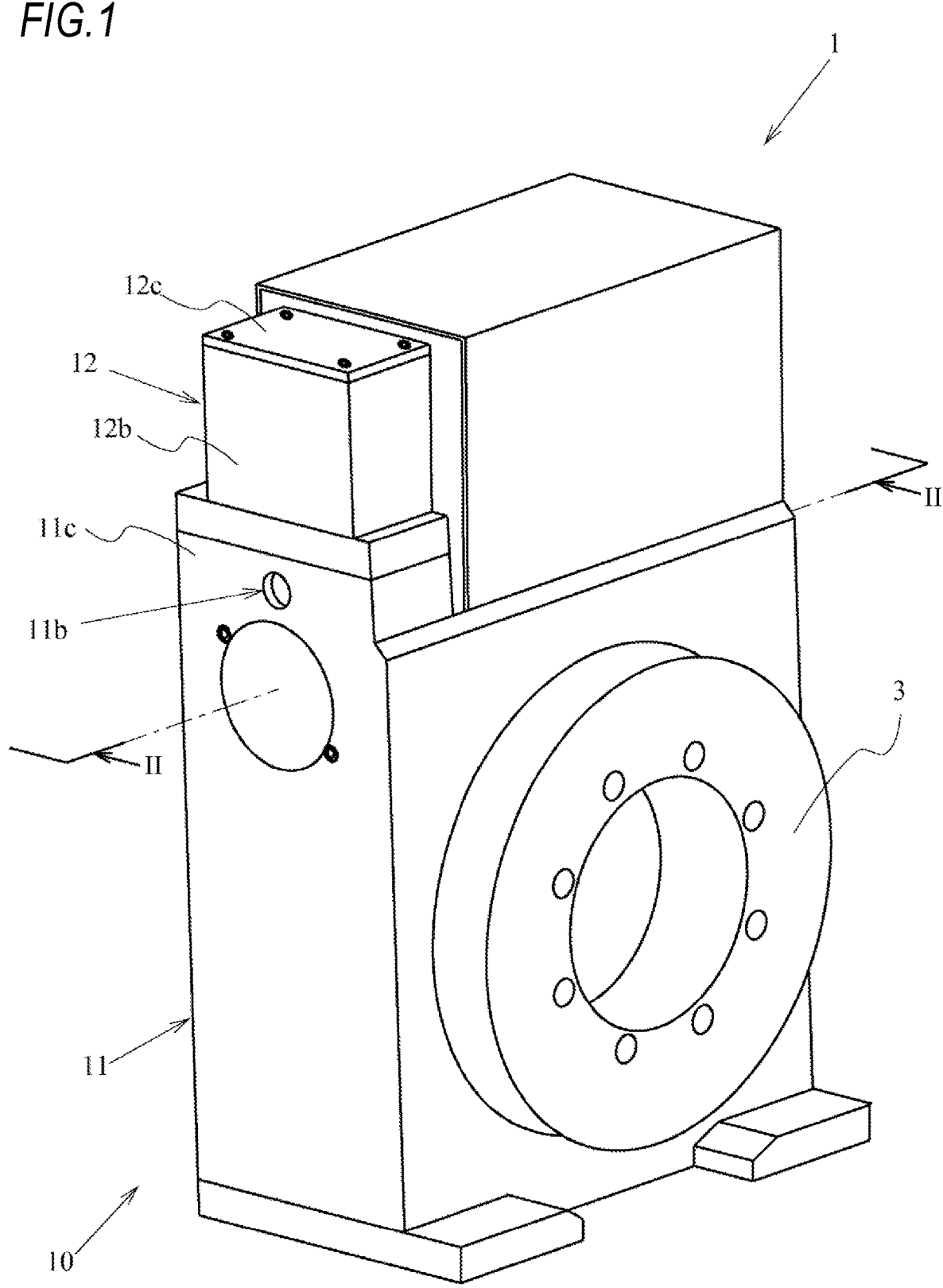
FIG. 1 is a schematic view showing the entirety of an embodiment of an indexing device according to the present invention.

FIG. 1 schematically shows an appearance of a rotary table device 1. The rotary table device 1 includes, as its constituent elements, a frame 10 installed on an installation surface (not shown) of a working machine, and a table 3 on which a workpiece is placed. Note that, in the shown example, the rotary table device 1 is a so-called vertical-type rotary table device installed so that a placement surface of the table 3 on which a workpiece is placed is perpendicular to the installation surface. The rotary table device 1 is configured to use a drive motor as a drive source and to index an angular position of the table 3 by rotating the table 3 serving as a drive target object by the drive motor.

Figure 2:
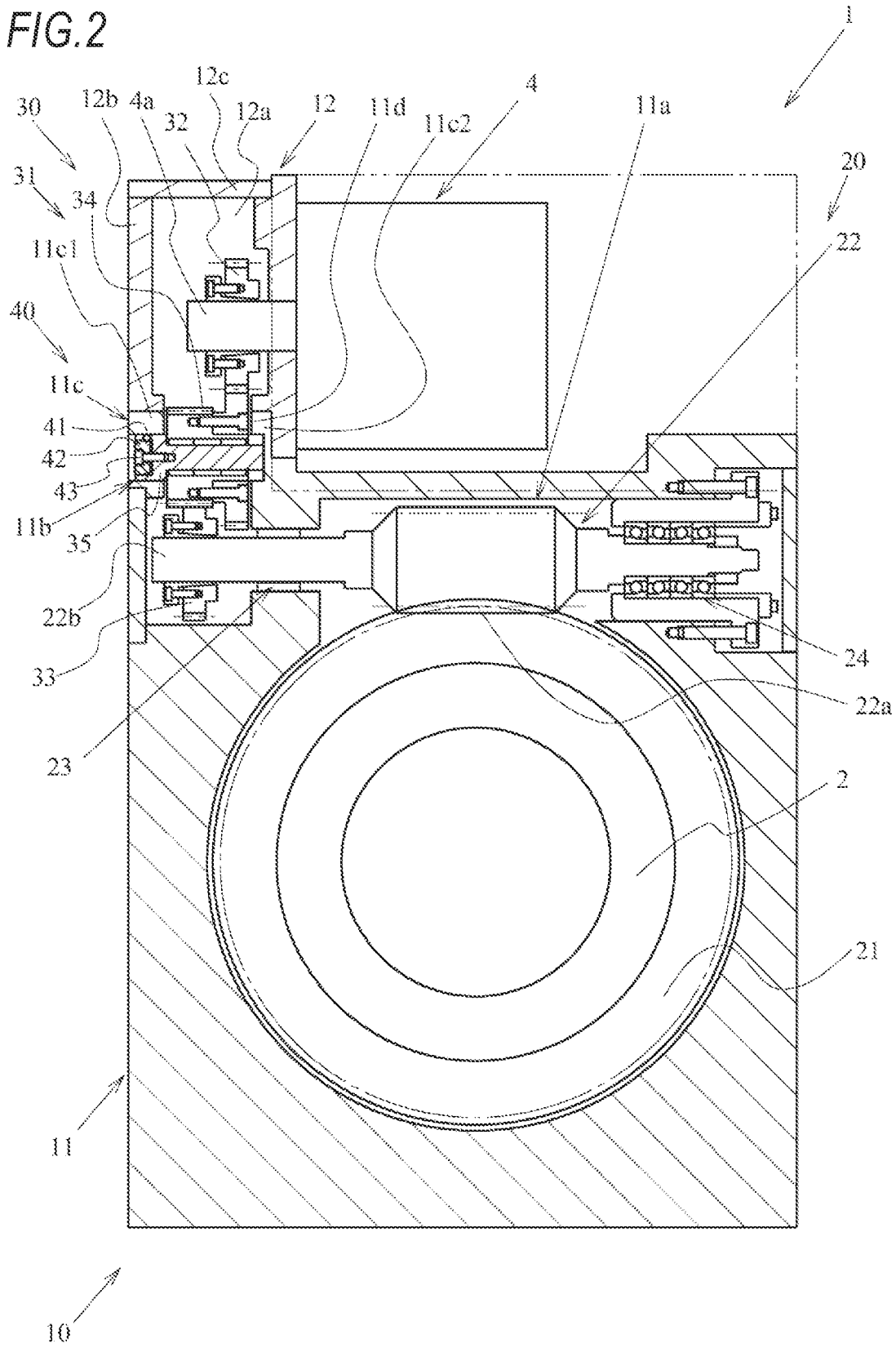
FIG. 2 is a cross-sectional front view taken along an II-II line in FIG. 1.
Figure 3:
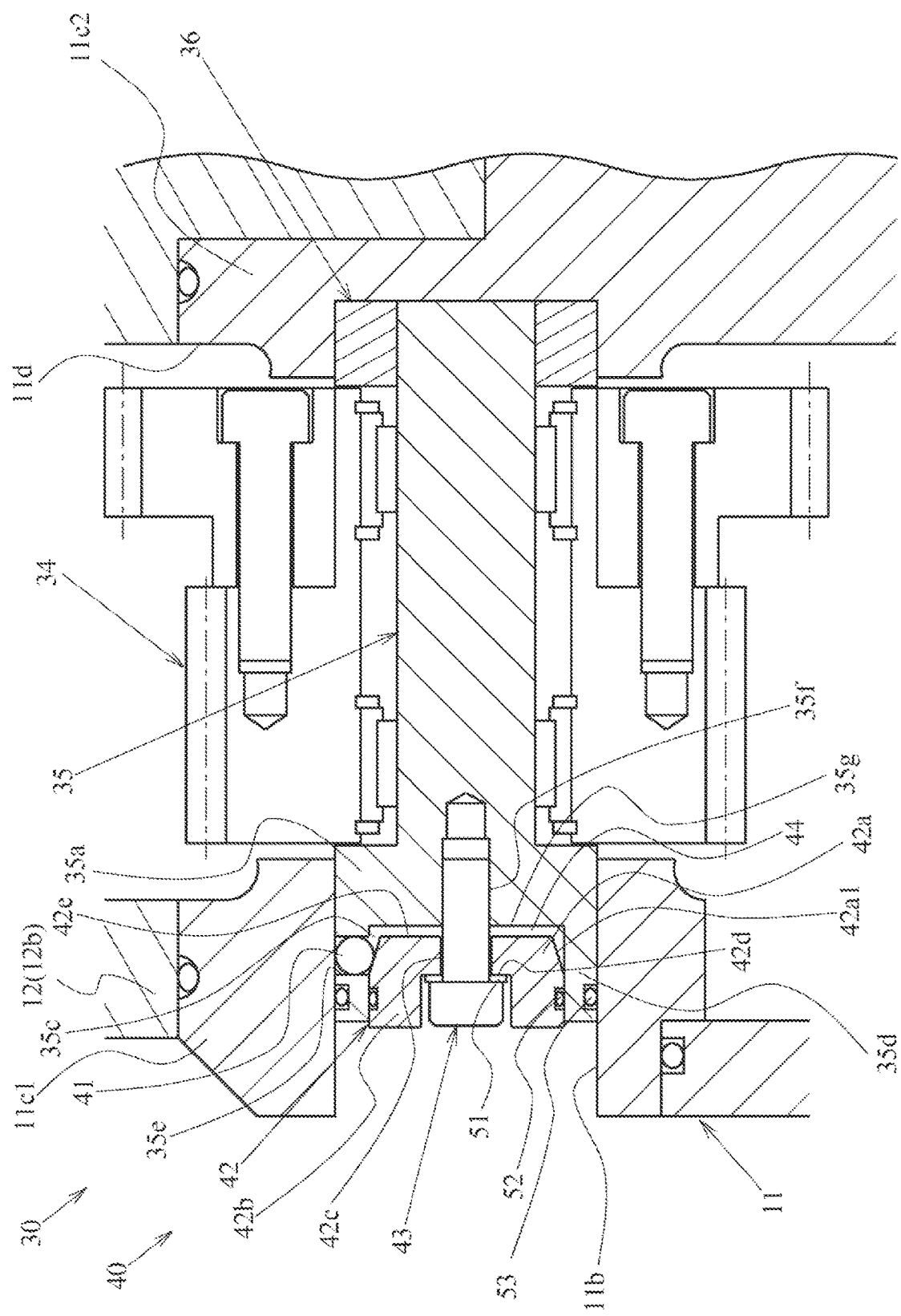
FIG. 3 is a partial cross-sectional front view showing main parts in FIG. 2.

In the rotary table device 1, the frame 10 has, as a main body, a main frame part 11, which occupies most of the frame 10, as shown in FIG. 2. In addition, the rotary table device 1 includes a main shaft 2 having one end to which the table 3 is attached. The main shaft 2 is rotatably supported with respect to the frame 10 (main frame part 11) via a bearing (not shown), in an accommodation space formed in the main frame part 11 of the frame 10. The table 3 is also attached to the main shaft 2 in such a way that the placement surface is exposed to a surface orthogonal to both side surfaces of the main frame part 11.

In addition, the main frame part 11 of the frame 10 has a worm shaft hole 11a in which a worm shaft of a drive transmission mechanism described later is accommodated. The worm shaft hole 11a is formed to penetrate through the main frame part 11 in a form of communicating with the accommodation space and opened to both side surfaces of the main frame part 11.

Further, the frame 10 includes a sub-frame part 12 to which the drive motor 4 serving as a drive source is attached. The sub-frame part 12 has a substantially rectangular parallelepiped shape in appearance and a space (internal space) 12a formed therein, and is configured by a peripheral wall portion 12b mainly composed of four peripheral walls so that the internal space 12a is opened upwards and downwards, and a plate-shaped cover portion 12c combined to the peripheral wall portion 12b so as to close the upper opening of the peripheral wall portion 12b.

The drive motor 4 is attached to an outer surface of one (attachment wall) of the peripheral walls of the peripheral wall portion 12b of the sub-frame part 12 with an output shaft 4a facing toward the sub-frame part 12. Note that, the attachment wall of the peripheral wall portion 12b is formed with a through-hole penetrating through the attachment wall so as to allow the drive motor 4 to be attached. Thereby, in a state where the drive motor 4 is attached to the attachment wall of the peripheral wall portion 12b, the output shaft 4a penetrates the attachment wall, and its end portion is located in the internal space 12a of the sub-frame part 12.

In addition, the sub-frame part 12 is attached to an upper surface (a surface opposite to a surface that is installed to the working machine) of the main frame part 11 in such an arrangement that a position of an outer surface of a peripheral wall parallel to the attachment wall with respect to a width direction of the frame 10 (penetration direction of the worm shaft hole 11a) is matched with a position of the side surface on one side of the main frame part 11. Note that, a portion on the upper surface of the main frame part 11 to which the sub-frame part 12 is attached is formed to protrude upward. In addition, a protruding portion (protrusion) 11c of the main frame part 11 is configured to have therein a space (communication space) 11d that communicates with the worm shaft hole 11a, and to have an opening on an upper surface side so that the communication space 11d is opened upward. Thereby, in a state where the sub-frame part 12 is attached to the main frame part 11 (protrusion 11c), the worm shaft hole 11a in the main frame part 11 and the internal space 12a in the sub-frame part 12 communicate with each other via the communication space 11d of the protrusion 11c.

Further, the rotary table device 1 includes a drive transmission mechanism 30 for transmitting drive of the drive motor 4 to the main shaft 2. The drive transmission mechanism 30 includes a worm gear mechanism 20 configured by a worm wheel 21 attached to the main shaft 2 and a worm shaft 22 in mesh with the worm wheel 21.

As for the worm gear mechanism 20, the worm wheel 21 is attached to the main shaft 2 so as not to be relatively rotatable at a position overlapping the worm shaft hole 11a with respect to an axis line direction of the main shaft 2, within the accommodation space in the frame 10 (main frame part 11). In addition, the worm shaft 22 includes a worm 22a in mesh with the worm wheel 21. The worm shaft 22 is rotatably supported with respect to the main frame part 11 (worm shaft hole 11a) on both sides of the worm 22a by bearings 23 and 24 in the worm shaft hole 11a of the main frame part 11. Further, the worm shaft 22 is in mesh with the worm wheel 21 at the worm 22a.

In addition, the drive transmission mechanism 30 includes a gear train 31 configured by a combination of a plurality of gears, and is configured to connect the worm shaft 22 to the output shaft 4a of the drive motor 4 via the gear train 31. The gear train 31 includes a first gear 32 attached to the end portion of the output shaft 4a of the drive motor 4, and a second gear 33 attached to a shaft portion 22b on one end side (the side surface side on one side with respect to the bearing 23) with respect to the worm 22a of the worm shaft 22.

In addition, the gear train 31 includes an intermediate gear 34 for transmitting rotation of the first gear 32 to the second gear 33. The intermediate gear 34 is configured to connect the first gear 32 and the second gear 33 each other. Note that, in the present embodiment, the intermediate gear 34 is a so-called two-stage gear configured by combining two gears with different numbers of teeth. In addition, in the intermediate gear 34, one of the two gears is connected to the first gear 32, and the other is connected to the second gear 33. The intermediate gear 34 is supported by an intermediate shaft 35 provided in the communication space 11d in a form of being bridged on both sidewalls 11c1 and 11c2 of the protrusion 11c of the main frame part 11.

As for the intermediate shaft 35 configured to support the intermediate gear 34, the protrusion 11c of the main frame part 11 on which the intermediate shaft 35 is bridged is formed with a through-hole 11b serving as an accommodation hole in the sidewall 11c1 on an outer side (the side surface side on one side of the main frame part 11) of both the sidewalls 11c1 and 11c2. Thereby, the intermediate shaft 35 can be inserted into the protrusion 11c from the accommodation hole 11b side. In addition, an inner diameter of the accommodation hole 11b is substantially the same as an outer diameter of one end portion 35a, which is a portion on one end side of the intermediate shaft 35. The intermediate shaft 35 is supported on the outer sidewall 11c1 of the protrusion 11c at one end portion 35a in a state of being inserted into the accommodation hole 11b.

In addition, the sidewall 11c2 (sidewall facing the outer sidewall 11c1) on an inner side of the protrusion 11c is formed with a circular groove opened in an inner peripheral surface thereof. The circular groove is formed such that a center thereof coincides with a center of the accommodation hole 11b as seen in the width direction and an inner diameter thereof is substantially the same as the inner diameter of the accommodation hole 11b. The intermediate shaft 35 is supported on the inner sidewall 11c2 of the protrusion 11c on the other end side in a form of being inserted into the circular groove. Note that, the intermediate shaft 35 is formed so that one end portion 35a inserted into the accommodation hole 11b is a large-diameter portion having a larger outer diameter than other portions. That is, in the intermediate shaft 35, an outer diameter of one end portion 35a is larger than an outer diameter of the portion on the other end side. Further, a bush 36 is attached to the circular groove in a fitting manner, and the intermediate shaft 35 is supported on the other end side in a form of being inserted into the bush 36.

Note that, the intermediate shaft 35 is made non-rotatable with respect to the protrusion 11c by a fixing mechanism described later while being supported in this way. The intermediate gear 34 is rotatably supported with respect to the intermediate shaft 35 via a bearing.

In the rotary table device 1 configured as described above, in the present invention, the fixing mechanism for fixing the intermediate shaft 35 to the frame 10 includes: a pressing member having a tapered surface and accommodated in an accommodating concave portion formed at one end portion 35*a* of the intermediate shaft 35; a screw member inserted into an insertion hole of the pressing member and screwed into a female screw hole of the intermediate shaft 35; and a steel ball disposed in the through-hole formed in the intermediate shaft 35 and mounted between the tapered surface of the pressing member and an inner peripheral surface of the accommodation hole 11*b*. In addition, the present embodiment is an example in which the entire tapered surface of the pressing member is located in the accommodating concave portion, and the pressing member is provided so as to slide with respect to the inner peripheral surface of the accommodating concave portion. The configuration of the rotary table device 1 including such a fixing mechanism will be described in detail with reference to FIGS. 3 and 4.

First, as for the intermediate shaft 35, one end portion 35*a* of the intermediate shaft 35 is formed with an accommodating concave portion 35*c*, which is a concave portion opened to an end face on the one end side. In addition, the accommodating concave portion 35*c* is circular as seen in the axis line direction of the intermediate shaft 35, and is formed so that a center coincides with a shaft center (a center of an outer peripheral edge of one end portion 35*a*) of the intermediate shaft 35. That is, one end portion 35*a* of the intermediate shaft 35 is configured to have a space opened to an outside within a peripheral wall 35*d* around the accommodating concave portion 35*c*. In addition, the intermediate shaft 35 is formed with three through-holes 35*e* (only one visible in a cross section is shown in the drawing) radially penetrating through the peripheral wall 35*d* around the accommodating concave portion 35*c*. The three through-holes 35*e* are formed at equal intervals in a circumferential direction of the peripheral wall 35*d*.

In addition, as for each component of the fixing mechanism 40, the pressing member 42 is a member formed mainly in a cylindrical shape. However, one end side of a peripheral surface of the pressing member 42 is formed to be a tapered surface 42*a*1. In this way, the pressing member 42 is configured by a tapered portion 42*a*, at which a peripheral surface on one end side of the pressing member is formed as a tapered surface 42*a*1, and a cylindrical portion 42*b*, which is a portion on the other end side with respect to the tapered portion 42*a*. In addition, an outer diameter of the cylindrical portion 42*b* is substantially the same as the inner diameter of the accommodating concave portion 35*c* of the intermediate shaft 35.

Note that, in the present embodiment, the pressing member 42 is formed so that its dimension in the axis line direction is substantially the same as a depth dimension of the accommodating concave portion 35*c* of the intermediate shaft 35. In addition, the pressing member 42 is configured such that a dimension of the tapered portion 42*a* and a dimension of the cylindrical portion 42*b* are substantially the same in the axis line direction, i.e., one end side with respect to a substantial center position is the tapered portion 42*a* and the other end side is the cylindrical portion 42*b*.

Further, the pressing member 42 is formed with an insertion hole 42*c* penetrating through the pressing member 42 in the axis line direction. The insertion hole 42*c* is formed such that a center thereof coincides with the shaft center of the pressing member 42 (cylindrical portion 42*b*) as seen in the axis line direction of the pressing member 42. However, the insertion hole 42*c* is formed such that an inner diameter thereof changes at a substantially intermediate position in the axis line direction of the pressing member 42, and an inner diameter on one end side (taper portion 42*a* side) is smaller than an inner diameter on the other end side (cylindrical portion 42*b* side). That is, the insertion hole 42*c* is formed to have a stepped portion including an end face 42*d* facing toward the other end side.

In each through-hole 35*e* of the intermediate shaft 35, a steel ball 4J that is a spherical body is disposed. Note that, the accommodating concave portion 35*c* is formed such that a thickness of the peripheral wall 35*d* around the accommodating concave portion 35*c* in which the through-hole 35*e* is formed is slightly smaller than a diameter of the steel ball 41. In other words, the diameter of the steel ball 41 is slightly larger than the thickness of the peripheral wall 35*d*. In addition, the through-hole 35*e* is formed so that an inner diameter thereof is substantially the same as the diameter of the steel ball 41. Therefore, in a state where the steel balls 41 are disposed (accommodated) in the respective through-holes 35*e* of the intermediate shaft 35 inserted into the accommodation hole 11*b* at one end portion 35*a*, the steel balls 41 are each in contact with the inner peripheral surface of the through-hole 35*e* and the inner peripheral surface of the accommodation hole 11*b* and a portion of the steel ball 41 protrudes inward from the inner peripheral surface of the peripheral wall 35*d*.

In addition, in the fixing mechanism 40, the pressing member 42 is accommodated in a form of being inserted into the accommodating concave portion 35*c* of the intermediate shaft 35 in a direction in which the axis line direction of the pressing member coincides with the axis line direction of the intermediate shaft 35 and the tapered portion 42*a* becomes the bottom surface 35*g* side of the accommodating concave portion 35*c* with respect to the cylindrical portion 42*b*. Thereby, the pressing member 42 comes into contact with the steel ball 41, which protrudes from the inner peripheral surface of the peripheral wall 35*d* as described above, on the tapered surface 42*a*1 of the tapered portion 42*a*. In other words, in a state where the pressing member 42 is accommodated in the accommodating concave portion 35*c* in this way, the steel ball 41 is sandwiched between the tapered surface 42*a*1 of the tapered portion 42*a* of the pressing member 42 and the inner peripheral surface of the accommodation hole 11*b*.

Note that, as described above, in the present embodiment, the fixing mechanism 40 is configured so that the pressing member 42 (cylindrical portion 42*b*) slides with respect to the inner peripheral surface of the accommodating concave portion 35*c* in a state where the pressing member 42 is accommodated in the accommodating concave portion 35*c*. For this reason, with respect to the axis line direction of the intermediate shaft 35, the position of the steel ball 41 at one end portion 35*a*, i.e., the position where the through-hole 35*e* in which the steel ball 41 is accommodated is formed is close to (near) the bottom surface 35*g* of the accommodating concave portion 35*c*. In addition, as described above, the inner diameter of the through-hole 35*e* is substantially the same as the diameter of the steel ball 41, but the dimension (depth dimension of the accommodating concave 35*c*), in the axis line direction of the intermediate shaft 35, of the peripheral wall 35*d* in which the through-hole 35*e* is formed is about a half of one end portion 35*a* with respect to the dimension in the axis line direction of the intermediate shaft 35.

Further, the tapered portion 42*a* of the pressing member 42 is formed so that an angle of the tapered surface 42*a*1 is such an angle that a gap 44 exists between an end face 42*e* on one end side of the pressing member 42 and the bottom surface 35g of the accommodating concave portion 35c in the state (accommodated state) where, as described above, the pressing member 42 is accommodated in the accommodating concave portion 35c and the steel ball 41 is in contact with the tapered surface 42a1 and the inner peripheral surface of the accommodation hole 11b.

Figure 4:
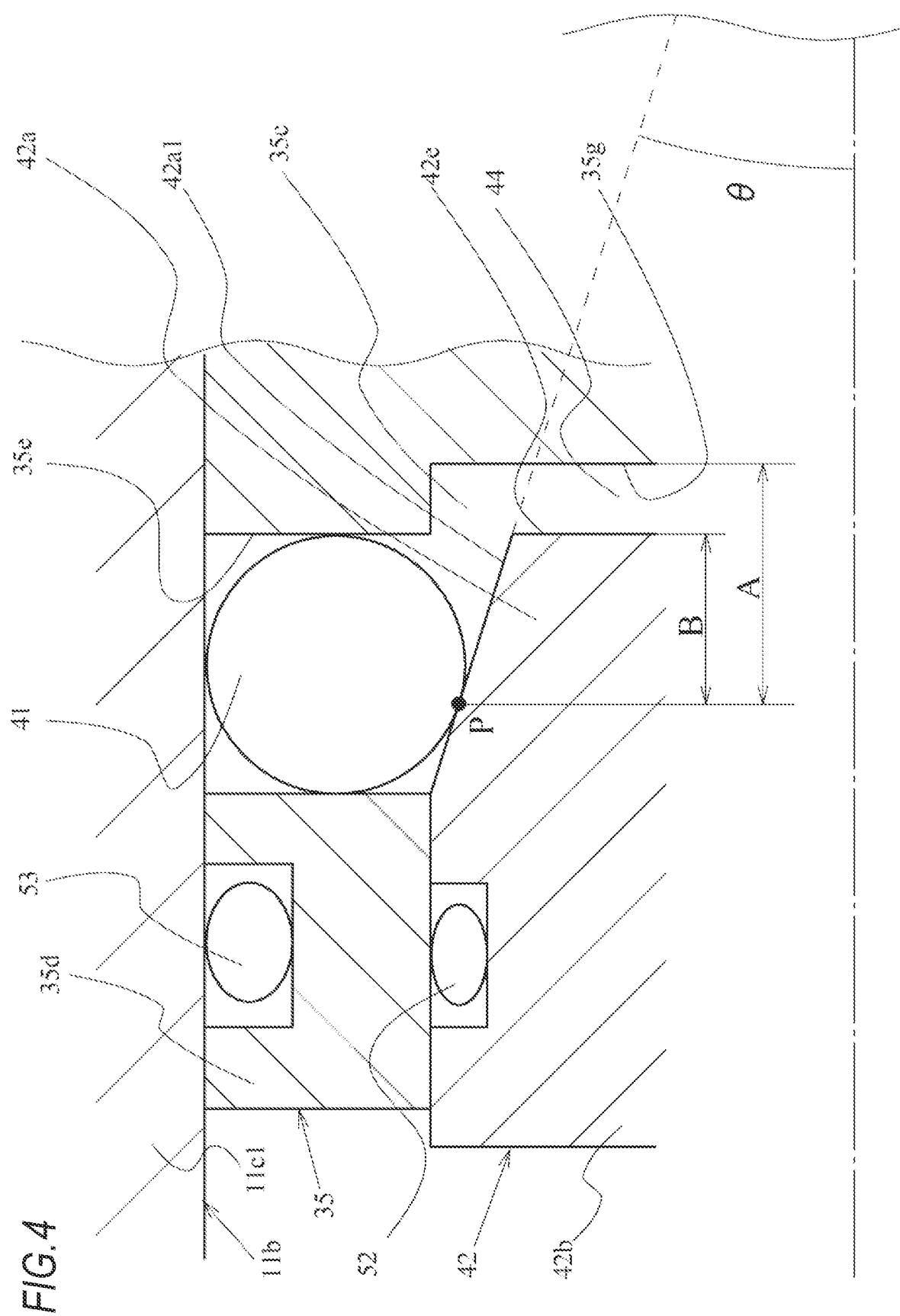
FIG. 4 is a partial cross-sectional front view showing main parts in FIG. 3.

Specifically, in the case where the diameter of the steel ball 41 is specified and the arrangement of the steel ball 41 (the position of the through-hole 35e) in the accommodating concave portion 35c in the axis line direction of the intermediate shaft 35 is specified, a position, on the tapered surface 42a1, of a contact point P between the tapered surface 42a1 of the tapered portion 42a of the pressing member 42 and the steel ball 41 and a distance A from the contact point P to the bottom surface 35g of the accommodating concave portion 35c, with respect to the axis line direction of the intermediate shaft 35, correspond to an angle of the tapered surface 42a1, more specifically, an angle (taper angle) θ of the tapered surface 42a1 with respect to the axis line of the pressing member 42 (FIG. 4). In addition, a distance B from the contact point P to the end face 42e on one end side of the pressing member 42 corresponds to the position of the contact point P on the tapered surface 42a1. For reference, as the taper angle θ increases, the distances A and B increase, and as the taper angle θ decreases, the distances A and B decrease. However, when the taper angle θ is changed, the change in the distances A and B with respect to the change is larger in the distance B.

Further, as for the taper angle θ, when a pressing force is applied to the pressing member 42 in the axis line direction, the pressing force also acts on the steel ball 41, and a radial force also acts on the steel ball 41 by an action of the tapered surface 42a1. Further, the radial force increases as the taper angle θ decreases.

Therefore, the taper angle θ of the tapered portion 42a of the pressing member 42 is an angle at which, when a predetermined pressing force is applied to the pressing member 42, the radial force acting on the steel ball 41 becomes a desired degree of force. At the same time, the taper angle θ is an angle at which the distance A is larger than the distance B. i.e., the gap 44 exists between the end face 42e on one end side of the pressing member 42 and the bottom surface 35g of the accommodating concave portion 35c in the state where the tapered portion 42a is in contact with the steel ball 41.

Further, the fixing mechanism 40 is provided with a screw member 43 for applying a force to displace the pressing member 42 in the accommodated state toward the bottom surface 35g of the accommodating concave portion 35c. As described above, the screw member 43 is provided in a form of being inserted into the insertion hole 42c of the pressing member 42 in the accommodated state and screwed into the intermediate shaft 35. Therefore, the intermediate shaft 35 is formed with a female screw hole 35f formed so that it is opened to the bottom surface 35g of the accommodating concave portion 35c and a center thereof coincides with the center of the insertion hole 42c of the pressing member 42 in the accommodated state as seen in the axis line direction of the intermediate shaft 35. The screw member 43 is screwed into the female screw hole 35f.

The screw member 43 is a screw member such as a bolt having a head portion. In addition, in the insertion hole 42c of the pressing member 42 through which the screw member 43 is inserted, an inner diameter on one end side (the tapered portion 42a side) is smaller than a size (outer diameter) of the head portion. Further, an inner diameter on the other end side (cylindrical portion 42b side) of the insertion bole 42c is larger than the size of the head portion. Therefore, in the state where the screw member 43 is inserted into the insertion hole 42c as described above, the screw member 43 is in a state where the head portion can come into contact with the end face 42d in the insertion hole 42c of the pressing member 42. The screw member 43 is screwed into the female screw hole 35f of the intermediate shaft 35, so that the head portion comes into contact with the end surface 42d. Note that, the female screw hole 35f is formed to have such a depth dimension that the screw member 43 can be further screwed from the state where the head portion of the screw member 43 is in contact with the end face 42d.

Further, a seal member 51 is mounted between the head portion of the screw member 43 and the end face 42d of the pressing member 42. In addition, seal members 52 and 53 such as O-rings are each mounted between the outer peripheral surface of the cylindrical portion 42b of the pressing member 42 and the inner peripheral surface of the peripheral wall 35d of the intermediate shaft 35 and between the outer peripheral surface of the peripheral wall 35d and the inner peripheral surface of the accommodation hole 11b. In this case, the seal member 53 mounted between the outer peripheral surface of the peripheral wall 35d and the inner peripheral surface of the accommodating hole 11b is provided on an outermore side (an opposite side to the bottom surface 35g side of the accommodating concave portion 35c) than the position of the through-hole 35e with respect to the axis line direction of the intermediate shaft 35.

In the rotary table device 1 configured as described above, when the screw member 43 is rotated in a further tightening direction in a state where the head portion of the screw member 43 is in contact with the end face 42d of the pressing member 42 in the accommodated state, an action of displacing the screw member 43 toward the bottom surface 35g side of the accommodating concave portion 35c of the intermediate shaft 35 is generated. Accordingly, the pressing member 42 in contact with the head portion of the screw member 43 is applied with a force (pressing force) directed from the head portion toward the bottom surface 35g of the accommodating concave portion 35c. Thereby, the pressing force acts on the steel ball 41 mounted and sandwiched between the tapered surface 42a1 of the pressing member 42 and the inner peripheral surface of the accommodation hole 11b.

When the pressing member 42 is in a state of applying the pressing force to the steel ball 41, a radial force directed toward the inner peripheral surface side of the accommodation hole 11b acts on the steel ball 41 by the action of the tapered surface 42a1, and therefore, the steel ball 41 is pressed against the inner peripheral surface of the accommodation hole 11b. As a result, the steel ball 41 is fixed to the inner peripheral surface of the accommodation hole 11b of the main frame part 1 by a frictional force corresponding to the pressing force. As a result of the steel ball 41 being fixed to the inner peripheral surface of the accommodation hole 11b of the main frame part 11 (frame 10), the intermediate shaft 35 is in a state of being fixed to the frame 10 via the pressing member 42 and the screw member 43.

In the fixing mechanism 40 for fixing the intermediate shaft 35 to the frame 10, as described above, the pressing member 42 is intended to be displaced (is applied with a displacing force) toward the bottom surface 35g side of the accommodating concave portion 35c, so that the pressing force acts on the steel ball 41. In the fixing mechanism 40, the mechanism to displace the pressing member 42 is not a mechanism in which the screw action for displacement is directly generated on the pressing member by screwing the pressing member into the intermediate shaft, as in the related art, but is a mechanism in which the screw member 43 provided with respect to the pressing member 42, as described above, is screwed into the intermediate shaft 35 and the screw action for displacement indirectly acts on the pressing member 42 via the screw member 43.

Thereby, in the fixing mechanism 40, the pressing member 42 and the intermediate shaft 35 can be configured such that the outer peripheral surface of the cylindrical portion 42b and the inner peripheral surface of the accommodating concave portion 35c are formed into a planar shape and they are in contact with each other on the planar surfaces According to this configuration, it is possible to arrange a seal member such as an O-ring between the outer peripheral surface of the cylindrical part 42b and the inner peripheral surface of the accommodating concave portion 35c. Therefore, in the fixing mechanism 40, the seal member 52 is arranged between the pressing member 42 and the intermediate shaft 35, as described above, so that even when the coolant liquid applied to the rotary table device 1 reaches a portion between the pressing member 42 and the intermediate shaft 35, the seal member 52 prevents the coolant liquid from being infiltrated into the frame 10 between the pressing member 42 and the intermediate shaft 35.

In addition, in the fixing mechanism 40, the screw member 43 functioning as described above is provided in the form of being inserted into the insertion hole 42c for the pressing member 42, but is provided to be in contact with the end face 42d orthogonal to the insertion direction at the head portion. Accordingly, the configuration enables a sealing member to be disposed between the screw member 43 and the pressing member 42. In the fixing mechanism 40, the seal member 51 is also provided between the head portion of the screw member 43 and the end face 42d of the pressing member 42, as described above. Thereby, also between the screw member 43 and the pressing member 42, the seal member 51 prevents the coolant liquid from being infiltrated into the frame 10. According to the fixing mechanism 40 configured as described above, the seal members are appropriately disposed as described above and the infiltration of the coolant liquid into the frame 10 is prevented, so that it is possible to prevent the problem that the lubrication performance of the lubricating oil stored in the frame is lowered, as much as possible.

In the above, one embodiment (hereinafter, referred to as above embodiment) of the indexing device to which the present invention is applied has been described. However, the present invention is not limited to the above embodiment, and can also be implemented by other embodiments (modified embodiments) as described below.

(1) As for the fixing mechanism, the fixing mechanism 40 of the above embodiment is configured such that the outer diameter of the cylindrical portion 42b of the pressing member 42 is formed substantially the same as the inner diameter of the accommodating concave portion 35c of the intermediate shaft 35 and the pressing member 42 is inserted into the accommodating concave portion 35c at the cylindrical portion 42b, and therefore, the pressing member 42 slides with respect to the intermediate shaft 35 in the axis line direction. However, in the present invention, the fixing mechanism is not limited to the configuration in which the sliding of the pressing member is guided by the intermediate shaft, as described above, and may be configured such that the sliding of the pressing member is guided by a portion (for example, an inner peripheral surface of the accommodation hole) on the frame side located outside the intermediate shaft.

Figure 5:
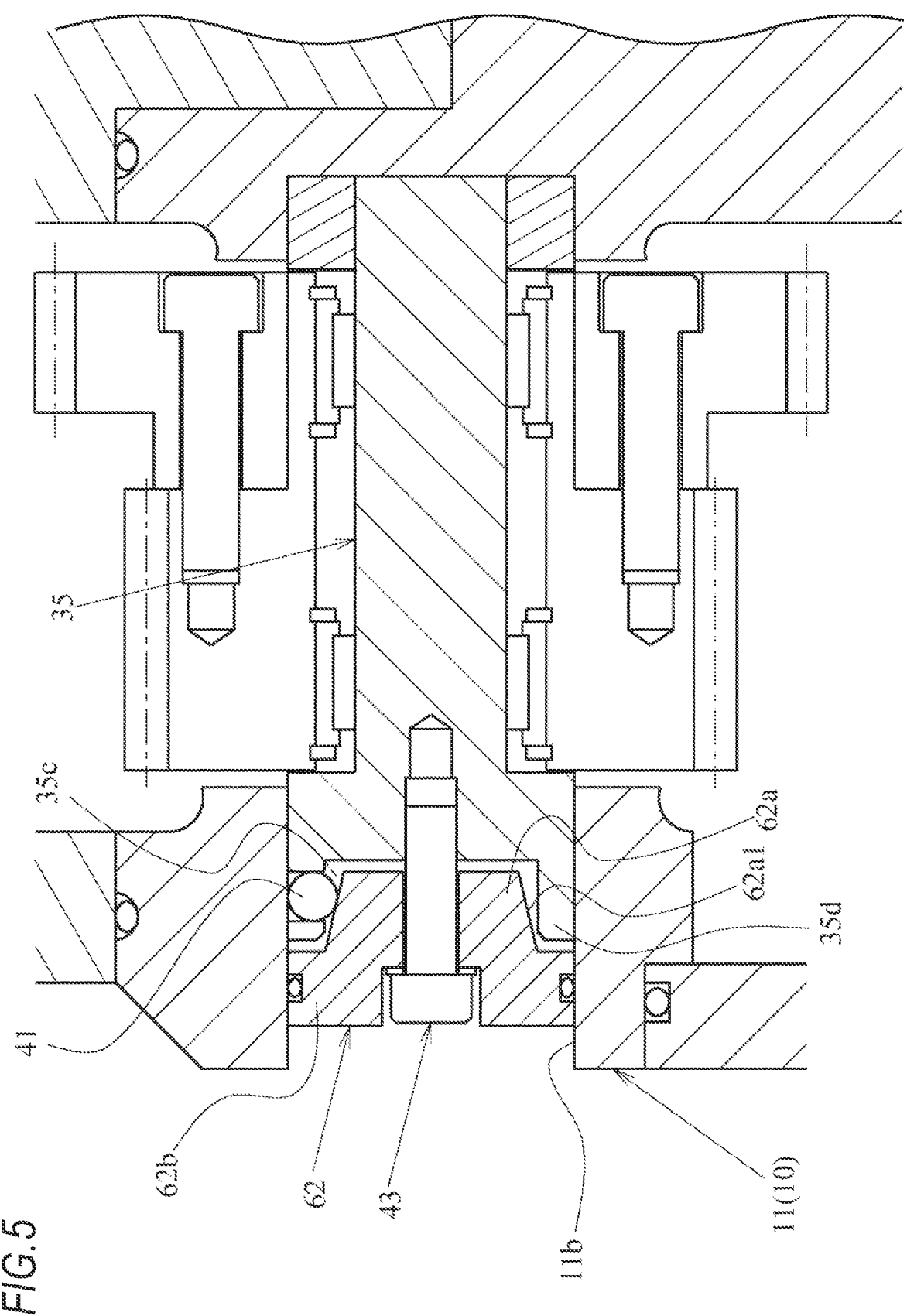
FIG. 5 is a partial cross-sectional front view showing main parts in another embodiment of the indexing device according to the present invention.

Specifically, as shown in FIG. 5, for example, in a configuration where the intermediate shaft 35 and the screw member 43 are the same as the above embodiment, a pressing member 62 is formed so that an outer diameter of a cylindrical portion 62b is substantially the same as the inner diameter of the accommodation hole 11b of the frame 10. The fixing mechanism is configured so that the pressing member 62 is provided in such a form that a tapered portion 62a is inserted into the accommodating concave part 35c of the intermediate shaft 35 and the cylindrical portion 62b is inserted into the accommodation hole 11b of the frame 10. Accordingly, in this configuration, the sliding of the pressing member 62 is guided at the cylindrical portion 62b on the inner peripheral surface of the accommodation hole 11b formed in the frame 10 (main frame part 11).

Note that, in this configuration, the tapered portion 62a is formed to have such a dimension that, in a state where the pressing member 62 (tapered portion 62a) is in contact with the steel ball 41, the tapered portion exists in a form of further protruding outward than the intermediate shaft 35 (accommodating concave portion 35c) with respect to the axis line direction of the pressing member 62. i.e., a gap exists between an end face on one end side (tapered portion 62a side) of the cylindrical portion 62 and an end face (tip end of the peripheral wall 35d) on one end side of the intermediate shaft 35. Accordingly, in the fixing mechanism, the entire tapered surface 62a1 of the pressing members 62 is not located within the accommodating concave portion 35c, as in the above embodiment, but a part thereof is located within the accommodating concave portion 35c. Note that, in the fixing mechanism configured in this way, in order to prevent infiltration of the coolant into the frame 10, a seal member such as an O-ring is placed between the outer peripheral surface of the cylindrical portion 62b of the pressing member 62 and the inner peripheral surface of the accommodation hole 11b.

Further, as for the pressing member, in the above embodiment, the pressing member 42 is configured only by the tapered portion 42a, which is a portion of the tapered surface 42a1 in contact with the steel ball 41, and the cylindrical portion 42b, which is a portion that slides with respect to the intermediate shaft 35. However, in the present invention, the pressing member is not limited to the configuration in which it consists of only the tapered portion and the cylindrical portion in this way, and may also be configured to have, in addition to the tapered portion and the cylindrical portion, for example, a cylinder-shaped portion that is continuous on an opposite side of the cylindrical portion to the tapered portion.

Further, in the above embodiment, the insertion hole 42c of the pressing member 42 is formed as a hole whose inner diameter on one end side is smaller than the head portion of the screw member 43 and inner diameter on the other end side is larger than the head portion of the screw member 43, and the head portion of the screw member 43 is inserted into the portion on the other end side. However, in the fixing mechanism of the present invention, the insertion hole of the pressing member is not limited to the configuration in which the inner diameter on the other end side is formed large as such, and may also be formed as a hole whose inner diameter is uniform throughout and is smaller than the head portion of the screw member. Note that, in this case, in the fixing mechanism, the head portion of the screw member is in contact with the end face on the other end side of the pressing member (applies the pressing force to the end face on the other end side) in a state where the screw member is screwed into the intermediate shaft 35.

Further, as for the fixing mechanism, in the above embodiment, the fixing mechanism 40 has such a configuration that the intermediate shaft 35 has three through-holes 35e and the three steel balls 41 are each disposed in each of the three through-holes 35e. However, in the fixing mechanism of the present invention, the number of steel balls may be two or more, and the number is not particularly limited. Also, the number of through-holes is not limited to the same number as the number of steel balls, and may be equal to or larger than the number of steel balls. That is, the present invention is not limited to the configuration where the steel balls are disposed in all the through-holes. For example, n (n≥3) through-holes may be formed and the steel balls may be disposed in the appropriately selected through-holes whose number is smaller than n.

(2) As for the drive transmission mechanism, in the above embodiment, the drive transmission mechanism 30 is configured such that the intermediate gear 34 is a so-called two-stage gear formed by combining two gears. However, in the present invention, the drive transmission mechanism may be configured such that when it is not necessary to change a reduction ratio by the intermediate gear, the intermediate gear is not the two-stage gear as in the above embodiment, but a so-called one-stage gear (idle gear) having one gear.

In addition, in the above embodiment, the drive transmission mechanism 30 is configured such that only one set of the intermediate gear 34 and the intermediate shaft 35 configured to support the intermediate gear 34 is provided. That is, the drive transmission mechanism 30 is configured so that the first gear 32 and the second gear 33 are directly connected to each other via one intermediate gear 34. Note that, regarding the indexing device that is the preamble of the present invention, there is also an indexing device configured so that the first gear and the second gear referred to in the present invention are connected to each other via two or more intermediate gears. The present invention can also be applied to an indexing device (drive transmission mechanism) having such two or more intermediate gears and an intermediate shaft configured to support each intermediate gear.

Further, as for the intermediate shaft configured to support the intermediate gear, in the above embodiment, the intermediate shaft 35 is formed so that the outer diameter of one end portion 35a inserted into the accommodation hole 11b is larger than the outer diameters of the other portions. However, in the indexing device that is the preamble of the present invention, the intermediate shaft is not limited to such a shape, and may be formed so that the outer diameter is uniform throughout, for example.

Further, in the above embodiment, the drive transmission mechanism 30 adopts the so-called worm gear mechanism 20 configured by the worm wheel 21 attached to the main shaft 2 and the worm shaft 22 having the worm 22a in mesh with the worm wheel 21. However, in the indexing device that is the preamble of the present invention, the drive transmission mechanism is not limited to employing such a worm gear mechanism. For example, as the drive transmission mechanism, a roller gear cam mechanism may be adopted which includes a roller gear where a plurality of rollers are arranged in a circumferential direction and a roller cam shaft having a spiral cam groove in mesh with the roller gear. Alternatively, as the drive transmission mechanism, a so-called ball drive mechanism (ball decelerator) configured so that a worm wheel and a worm shaft are indirectly engaged with each other via a ball serving as an engaging member may also be adopted.

(3) As for the indexing device to which the present invention is applied, in the examples described above, the present invention is applied to a so-called rotary table device having a table on which a workpiece is placed and configured to index the angular position of the table. However, the indexing device to which the present invention is applied is not limited to such a rotary table device. For example, other indexing devices such as a milling head (spindle head) having a main spindle serving as a drive target supported by a support shaft corresponding to the main shaft, and configured to index an angular position of the main spindle around an axis of the support shaft are also possible.

The present invention is not limited to the above embodiment, and can be variously changed without departing from the gist of the present invention.

What is claimed is:

1. An indexing device configured to index an angular position of a drive target object by using a drive motor as a drive source, and comprising:
  a drive transmission mechanism including:
    a first gear attached to an output shaft of the drive motor;
    a second gear attached to a drive shaft for driving the drive target object; and
    an intermediate gear configured to transmit rotation of the first gear to the second gear and rotatably supported with respect to an intermediate shaft fixed to a frame, the intermediate shaft being inserted at an end portion into an accommodation hole formed in the frame, the intermediate shaft including:
      an accommodating concave portion having a bottomed hole shape formed at the end portion, opened to an end face, being circular as seen in an axis line direction, and formed to have a center matched with a center of an outer peripheral edge of the end face; and
      a plurality of through-holes radially penetrating a peripheral wall around the accommodating concave portion, and
  a fixing mechanism for fixing the intermediate shaft to the frame including:
    a cylindrical pressing member having a tapered surface on a peripheral surface, having an insertion hole penetrating in the axis line direction at a center position, and provided such that the tapered surface faces a bottom surface of the accommodating concave portion and at least a portion of the tapered surface is located in the accommodating concave portion;
    steel balls disposed in each through-hole and having a larger diameter than a thickness of the peripheral wall; and
    a screw member inserted into the insertion hole of the pressing member and screwed into a female screw hole opened to the bottom surface,
  wherein,
  there is a gap between the pressing member and the bottom surface in a state in which the pressing member is accommodated in the accommodating concave portion and the steel ball accommodated in each through-hole is in contact with the tapered surface and an inner peripheral surface of the accommodation hole.

* * * * *